Feb. 25, 1969 H. S. MARX 3,430,105

ELECTRICAL COMPONENT ASSEMBLY WITH IMPROVED STRUT FASTENING MEANS

Filed Aug. 9, 1965

Inventor
Hilbert Stanley Marx
By Pendleton, Neuman, Seibold & Williams
Attorneys United States Patent Office 3,430,105
Patented Feb. 25, 1969

3,430,105

ELECTRICAL COMPONENT ASSEMBLY WITH IMPROVED STRUT FASTENING MEANS

Hilbert Stanley Marx, Menomonee Falls, Wis., assignor to Globe-Union Inc., Milwaukee, Wis., a corporation of Delaware Filed Aug. 9, 1965, Ser. No. 478,079
U.S. Cl. 317—112 2 Claims
Int. Cl. H02b 1/04

ABSTRACT OF THE DISCLOSURE

An electrical switch apparatus with a plurality of spaced wafers and a shaft connecting the wafers. Nonconducting cylindrical struts extend through apertures in the wafers and compressively engage the walls of the apertures to support the wafers in spaced relationship.

The present invention relates in general to an improved electrical component assembly and, more specifically, to an improved rotary switch assembly and the method of manufacture thereof.

Rotary switches having a plurality of layers or wafers assembled in stacked relationship on a common shaft are quite common in modern electronic equipment. Conventionally, each switch section has an annular insulating support with a plurality of conductive poles mounted circumferentially thereon. A centrally mounted rotary element carrying an annular metallic wiper completes circuits between the various poles in selected combinations as a result of the particular angular position of the rotary member.

The stacked rotary switch in most general use today is assembled by the use of two or more long bolts passing through aligned apertures in the various wafers with cylindrical spaces carried by the bolts to maintain the wafers in generally parallel spaced relationship. Such an assembly involves many parts which are expensive to manufacture and difficult and expensive to assemble. Furthermore, the bolts and cylindrical spaces introduce electrical interference if they are not carefully electrically interconnected by auxiliary means. Also, the bolts and spacers are bulky and cumbersome, increasing the overall size of the rotary switch assembly.

It is therefore a principal object of the present invention to provide a new and improved electrical component assembly. More specifically, it is an object to provide a new and improved rotary switch assembly. In this connection, it is an object to provide an improved method of manufacturing a rotary switch which may readily be incorporated in an automatic assembly process. A related object is to provide a new and improved method for the manufacture and assembly of a plurality of multiple pole rotary switches in a single aligned unit.

A more specific object of the present invention is to provide a new and improved electrical component assembly employing a nonconductive strut assembly. Still another object is to provide such an assembly having an improved voltage breakdown characteristic. A further object is to provide such an assembly which reduces the undesirable condition of rotor rub.

A more general object of the present invention is to provide a new and improved electrical component assembly requiring a minimum number of parts. In this connection, it is an object to provide such an assembly having enhanced rigidity with a reduced number of parts. Still another more general object is to provide an improved rotary switch assembly having enhanced physical appearance and requiring less spacing for mounting. Moreover, it is an object to provide such an assembly characterized in its low cost per assembled unit resulting from its requirements for less parts and less labor.

Other objects and advantages of the present invention will become apparent upon reading the attached detailed description taken in conjunction with the drawing.

In one form of the present invention, a plurality of elongated struts are provided which have at least one axially extending slot formed therein and a plurality of electrical components are provided which are supported in substantially parallel spaced relationship by the struts. Each component has a plurality of apertures formed therein corresponding in number to the struts and the apertures are smaller in cross section than the struts. The struts extend through the apertures and a press fit exists therebetween. The struts may be formed of a suitable flexible or compressible material such as fiberglass, a plastic or a metal, and may be substantially cylindrical in shape. Under the latter conditions, circular apertures are provided in the components which have smaller diameters than the struts. The assembly may be provided with a mounting plate. The new and improved method for assembling component assemblies of this type also forms a part of this invention.

The invention will now be described with reference to the drawing, wherein.

Figures 1, 2, 3, 4, 5, 6:
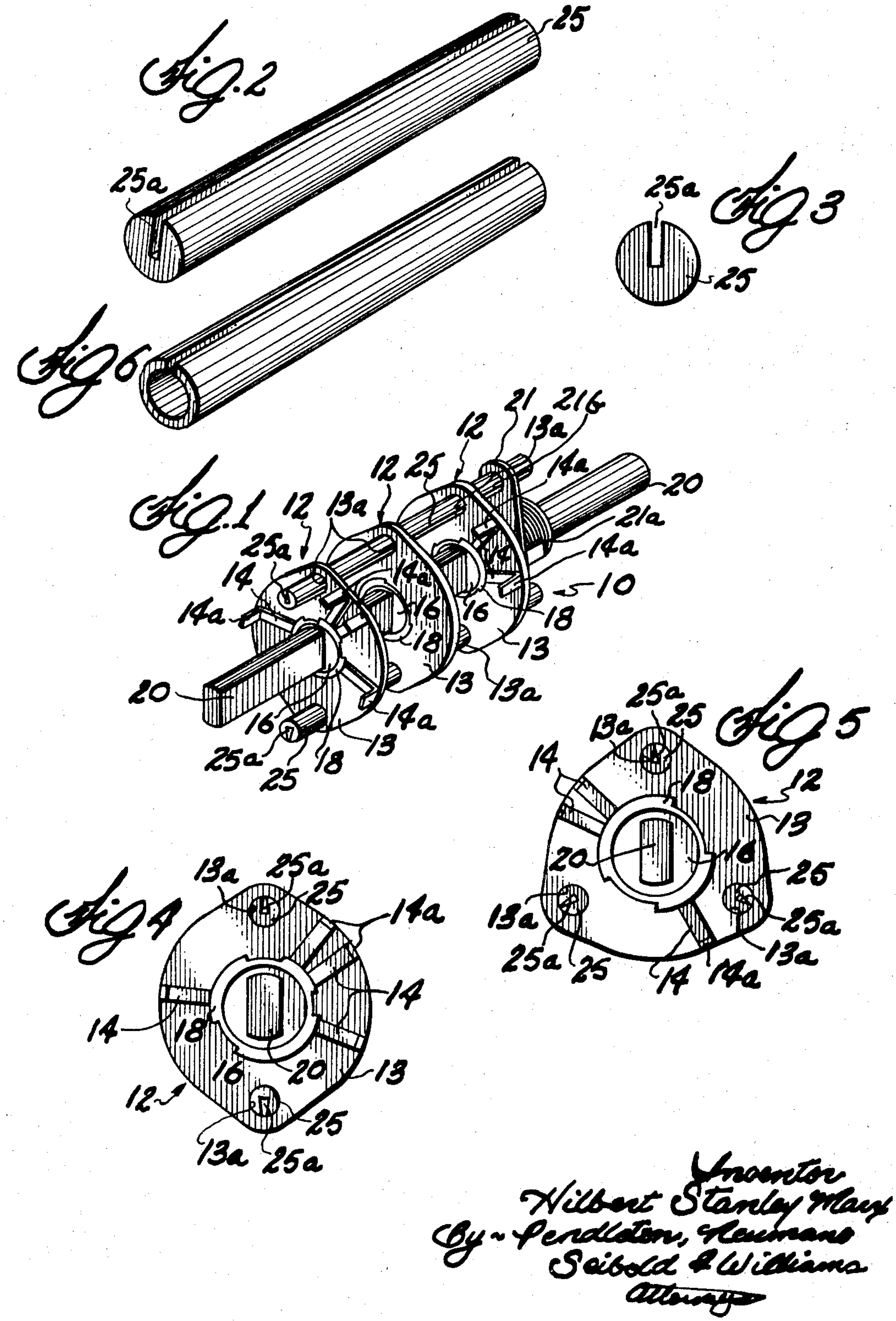
FIG. 1 is a perspective view of an electrical component assembly constructed in accordance with the teachings of the present invention.
FIG. 2 is a perspective view of an elongated strut utilized in the assembly of FIG. 1.
FIG. 3 is an end view of the strut shown in FIG. 2.
FIG. 4 is an end view of the assembly shown in FIG. 1.
FIG. 5 is an end view of a modified electrical component assembly constructed in accordance with the teachings of the present invention.
FIG. 6 is a perspective view of a modified elongated strut which may be utilized in the assemblies of FIGS. 1, 4 and 5.

While the invention has been shown and will be described in some detail with reference to particular exemplary embodiments thereof, there is no intention that it be limited to such detail. Quite to the contrary, it is intended here to embrace all modifications, alternatives falling within the spirit and scope of the invention as defined by the appended claims.

Referring now to the drawings and more specifically to FIG. 1, an electrical component assembly 10 constructed in accordance with the teachings of the present invention is shown. The component assembly 10 is, in the illustrated embodiment, a rotary switch assembly having a plurality of aligned electrical components in the form of switch sections 12 which are to be supported in substantially parallel spaced relationship. Each switch section 12 includes an annular disc-like wafer or web 13 which is generally formed of relatively rigid plastic material such as a fiber sheet impregnated with phenolic. Radially extending contacts 14 of a resilient conductive material are secured to the wafers at spaced positions around the surface thereof. The contacts 14 have terminal portions 14*a* that allow for electrical connection to remote circuitry. An insulating central rotary member 16 is secured in each wafer with a conductive annulus 18 secured thereto. The conductive annulus 18 has a pattern of wipers or contacts extending radially outward therefrom which engage the resilient contacts 14 to form electrical connections between selected ones of the contacts 14 at prescribed times during each revolution of the rotary member 16. Thus, as the rotary member 16 is rotated, the wipers of the conductive annulus 18 engage various contacts 14 in a predetermined pattern. For the purpose of imparting rotational movement to the rotary member 16, a shaft 20, which in the exemplary arrangement is shown as being manually operable, is provided which extends through central keyed apertures in the rotary members 16 and drivingly engages each rotary member. The exemplary rotary switch assembly 10 is provided with a mounting plate 21 which is to be supported in substantially parallel spaced relationship with the switch sections 12. The mounting plate 21 has a threaded bushing 21*a* and has a central bore extending therethrough through which the shaft 20 extends. In the mounting of the assembly 10 on a panel or wall, the threaded bushing 21*a* and the shaft 20 are extended through an aperture in the panel and a nut is threaded onto the threaded portion 21*a* to lock the assembly in place on the panel.

In accordance with the present invention, new and improved means are provided for supporting the switch sections 12 and the mounting plate 21 in substantially parallel spaced relationship. For this purpose, a plurality of elongated substantially cylindrical struts 25 are provided which have an axially extending slot 25*a* formed therein (see FIGS. 1–4). The struts 25 are preferably constructed of a nonconductive flexible or compressible material such as fiberglass or plastic, though the struts may be formed of a flexible metal. In the exemplary arrangement of FIGS. 1 and 4, a pair of struts 25 are provided. In keeping with the invention, a pair of circular apertures 13*a* are provided in the wafers 13 of the switch sections 12 and a pair of circular apertures 21*b* are provided in the mounting plate 21. The struts 25 extend through the apertures 13*a* and 21*b*. The apertures 13*a* and 21*b* are formed with smaller diameters than the relaxed struts 25 so that the struts are slightly compressed within the apertures 13*a* and 21*b* (see FIGS. 1 and 4). Consequently, a pressed fit exists between the struts 25 and the switch sections 12 and between the struts 25 and the mounting plate 21 so that the switch sections 12 and the mounting plate 21 are supported in substantially parallel spaced relationship by the struts 25.

A brief description of the method of assembling the switch assembly 10 shown in FIGS. 1 and 4 may be helpful in understanding the present invention. Initially, a pair of elongated substantially cylindrical compressible struts 25 are formed which have axially extending slots 25*a* formed therein and a plurality of switch sections 12 are formed which have pairs of circular apertures formed therein having smaller diameters than the relaxed struts 25. Additionally, a mounting plate 21 is formed which likewise has a pair of circular apertures 21*b* formed therein having diameters smaller than the diameters of the struts 25. The struts are then compressed and are extended through the apertures 13*a* and 21*b* until the switch sections 12 and the mounting plate 21 are disposed in substantially parallel spaced relationship. The struts 25 are then allowed to expand into engagement with the apertures 13*a* and 21*b* so that a press fit exists therebetween and so that the switch sections 12 and mounting plate 21 are thereby supported in the desired relative positions. The shaft 20 may then be extended through the switch assembly 10. Alternatively, the shaft 20 could be extended through the switch assembly prior to the struts 25 being extended through the apertures 13*a* and 21*b*.

Referring now to FIG. 5, an alternative embodiment of the switch assembly 10 is shown which is constructed in accordance with the teachings of the present invention. In this embodiment, three elongated substantially cylindrical compressible struts 25 having axially extending slots 25*a* are utilized and three circular apertures 13*a* are provided in the switch sections 12. In like manner, three circular apertures (not shown) are provided in the mounting plate 21. This arrangement may be utilized in those applications wherein a sturdier and more rigid switch construction is required. Moreover, it will be readily apparent that any desired plurality of struts may be utilized which are extended through a corresponding plurality of apertures in the switch sections 12 and the mounting plate 21.

Referring to FIG. 6, an alternative strut 25' is shown which may be utilized in the assemblies of FIGS. 1, 4 and 5. The strut 25' is in the form of a tube having an axial slot 25*a'* formed therein. As will be apparent, the strut 25' may likewise be formed of any suitable matrial such as fibrglass, a plastic or a metal.

While the exemplary struts have axial slots formed therein, it will be apparent that the struts may take various other forms as long as the struts are compressible. Consequently, the present invention is intended to cover the use of any flexible strut.

Electrical component assemblies constructed in accordance with the present invention have been found to have improved voltage breakdown characteristics as compared to the present conventional assemblies employing long bolts and cylindrical spacers disposed between the wafers. When the struts 25 are constructed of a nonconductive material such as fiberglass or a plastic, no arcing may exist between these struts and adjacent contacts. Quite to the contrary, with the metallic bolts and spacers presently used, such arcing often occurs. Additionally, electrical component assemblies constructed in accordance with the teachings of the present invention reduce the undesirable condition of rotor rub which exists with present conventional assemblies of this type. The switch sections of conventional systems are bolted together with inflexible rods and, if the switch assembly is assembled off-center, the rods are disposed at an angle other than a right angle with respect to the switch sections so that the rotors are caused to operate off-center. Consequently, rotor rub exists. With the struts 25 constructed of a flexible or compressible material, the switch assembly has inherent natural give which causes the assembly to tend to center naturally so that the rotors do not operate off-center and the condition of rotor rub is substantially eliminated.

What is claimed is:

1. A rotary electrical assembly comprising a plurality of spaced wafers, each supporting materials having electrical properties and each having at least one aperture formed therein; a shaft extending through said wafers; means for contacting said materials in a manner dependent upon the rotary position of the shaft; at least one non-conducting cylindrical strut having an axially extending slot formed therein, said strut extending through the apertures formed in said wafers and compressively engaging the walls of said apertures to support said wafers.

2. A rotary electrical assembly as claimed in claim 1 wherein a plurality of apertures are formed in each of said wafers and a plurality of struts are employed to support said wafers.

References Cited

UNITED STATES PATENTS

| | | | |
|---|---|---|---|
| 2,931,003 | 3/1960 | Huetten et al. | 317—101 |
| 3,093,713 | 6/1963 | Eadie | 200—14 |
| 3,248,490 | 4/1966 | Allison | 200—14 |

LEWIS H. MYERS, *Primary Examiner.*

J. R. SCOTT, *Assistant Examiner.*

U.S. Cl. X.R.

317—101